United States Patent
Arce et al.

(10) Patent No.: US 10,731,626 B2
(45) Date of Patent: Aug. 4, 2020

(54) WIND TURBINE BLADE HAVING DEPLOYABLE AERODYNAMIC DEVICES

(71) Applicant: LM WP PATENT HOLDING A/S, Kolding (DK)

(72) Inventors: Carlos Arce, Kolding (DK); Martin Dahl, Kolding (DK); Jesper Madsen, Gesten (DK)

(73) Assignee: LM WP PATENT HOLDING A/S, Kolding (DK)

( * ) Notice: Subject to any disclaimer, the term of this patent is extended or adjusted under 35 U.S.C. 154(b) by 968 days.

(21) Appl. No.: 15/105,823

(22) PCT Filed: Dec. 18, 2014

(86) PCT No.: PCT/EP2014/078462
§ 371 (c)(1),
(2) Date: Jun. 17, 2016

(87) PCT Pub. No.: WO2015/091797
PCT Pub. Date: Jun. 25, 2015

(65) Prior Publication Data
US 2016/0312763 A1    Oct. 27, 2016

(30) Foreign Application Priority Data
Dec. 20, 2013 (EP) ..................................... 13198952

(51) Int. Cl.
*F03D 1/06* (2006.01)

(52) U.S. Cl.
CPC ...... *F03D 1/0633* (2013.01); *F05B 2240/122* (2013.01); *F05B 2240/2211* (2013.01); *F05B 2240/311* (2013.01); *Y02E 10/721* (2013.01)

(58) Field of Classification Search
CPC ...... F03D 1/0633; F03D 1/0641; F03D 1/065; F03D 1/0683; F05B 2240/311
See application file for complete search history.

(56) References Cited

U.S. PATENT DOCUMENTS

| | | | | |
|---|---|---|---|---|
| 2,800,291 | A | * | 7/1957 | Stephens ................ B62D 35/00 114/67 R |
| 5,088,665 | A | * | 2/1992 | Vijgen .................... B64C 23/06 244/198 |
| 7,059,833 | B2 | * | 6/2006 | Stiesdal ................ F03D 1/0641 416/41 |

(Continued)

FOREIGN PATENT DOCUMENTS

| DE | 102012000431 A1 | 7/2013 |
|---|---|---|
| EP | 1314885 A1 | 5/2003 |

(Continued)

*Primary Examiner* — Kayla Mccaffrey
(74) *Attorney, Agent, or Firm* — Nath, Goldberg & Meyer; Jerald L. Meyer; Tanya E. Harkins (57) ABSTRACT

A wind turbine blade is described, as well as a trailing edge plate for a wind turbine blade. A flexible flow modulation device, e.g. an acoustic flap or a plurality of serrations, is arranged at the trailing edge of a wind turbine blade, wherein the flexible device is coupled to at least one aerodynamic device, preferably vortex generators. As the flexible device is bent by action of flow over the wind turbine blade, the at least one aerodynamic device is deployed to provide for attached flow over the bent flexible device.

16 Claims, 6 Drawing Sheets

(56) References Cited

U.S. PATENT DOCUMENTS

| | | | | |
|---|---|---|---|---|
| 8,506,250 B2* | 8/2013 | Bagepalli | ............. | F03D 1/0675 |
| | | | | 416/62 |
| 9,638,164 B2* | 5/2017 | Vedula | ................. | F03D 1/0675 |
| 9,945,357 B2* | 4/2018 | Enevoldsen | ......... | F03D 7/0204 |
| 2014/0356181 A1* | 12/2014 | Mailly | ................. | F03D 1/0641 |
| | | | | 416/229 A |

FOREIGN PATENT DOCUMENTS

| | | |
|---|---|---|
| EP | 2628946 A1 | 8/2013 |
| WO | 2011157849 A2 | 12/2011 |

* cited by examiner

WIND TURBINE BLADE HAVING DEPLOYABLE AERODYNAMIC DEVICES

This is a National Phase Application filed under 35 U.S.C. 371 as a national stage of PCT/EP2014/078462, filed Dec. 18, 2014, an application claiming the benefit of European Application No. 13198952.7, filed Dec. 20, 2013, the content of each of which is hereby incorporated by reference in its entirety.

FIELD OF THE INVENTION

The present invention relates to a wind turbine blade having deployable aerodynamic devices, and to a trailing edge plate having deployable aerodynamic devices for attachment to the trailing edge of a wind turbine blade.

BACKGROUND OF THE INVENTION

In an effort to increase lift or reduce drag and/or noise levels of wind turbine blades, devices are often used at the trailing edge of wind turbine blades to adjust or regulate the flow in the wake of the wind turbine blade. Such devices may include serrations, bristles, or acoustic flaps. These devices operate through the modification of the flow properties, and/or through the adsorption of energy from the airflow over the blades through mechanical bending of the devices under action of the wind.

One issue with such devices, however, is that the bending of such devices during operation of the wind turbine may result in flow separation is the region of the devices, due to the relatively high angle of attack in the region of the bent devices. Such flow separation can result in an increased drag effect for the wind turbine blade, and/or increased operational noise of the wind turbine blade.

It is an object of the invention to provide a solution for a wind turbine blade wherein flow separation over trailing edge devices is prevented during periods of bending of the trailing edge devices, without impacting on normal operation of the wind turbine blade.

SUMMARY OF THE INVENTION

Accordingly, there is provided a wind turbine blade having an airfoil profile with a leading edge and a trailing edge and a chord extending therebetween, the blade further comprising:
  at least one flexible member projecting from the trailing edge of the blade,
  wherein said at least one flexible member is arranged to flex under action of airflow over the wind turbine blade, and
  wherein the flexing of said at least one flexible member acts to deploy at least one aerodynamic device, preferably vortex generators, at the trailing edge of the wind turbine blade, to prevent flow separation over said at least one flexible member.

The at least one flexible member may comprise any suitable device or devices which are arranged at a blade trailing edge, for example for aerodynamic and/or noise purposes. For example, the at least one flexible member may comprise any combination of the following: an acoustic flap, serrations, bristles, etc. The aerodynamic devices may include any device suitable for influencing the aerodynamic flow over the at least one flexible member. For example, the at least one aerodynamic device may comprise any combination of the following: microtabs, microflaps, vortex generators, etc.

Preferably, said step of deploying the at least one aerodynamic device comprises levering or raising said at least one aerodynamic device above a surface of said wind turbine blade.

In a preferred embodiment, there is provided a wind turbine blade having an airfoil profile with a leading edge and a trailing edge and a chord extending therebetween, the blade further comprising:
  a plurality of flow modulation devices projecting from the trailing edge of the blade,
  wherein said plurality of flow modulation devices are arranged to flex under action of airflow over the wind turbine blade, and
  wherein the flexing of said plurality of flow modulation devices acts to deploy vortex generators at the trailing edge of the wind turbine blade, to prevent flow separation over said flow modulation devices.

During operation of a wind turbine, trailing edge devices of a wind turbine blade may deflect or bend under action of the wind flow over the blade. Such bending or deflection may be to a degree that the trailing edge devices are bent away from the direction of laminar flow over the blade airfoil. This may result in flow separation over the trailing edge devices, which can lead to increased drag. As the flow modulation devices, which are preferably vortex generators, are deployed on the bending of the flow modulation device, this provides for attached flow in the wake of the deployed devices, thereby preventing flow separation over the trailing edge devices.

It will be understood that the deployment of said vortex generators results in the projection of the vortex generators above the surface of the wind turbine blade, preferably from a recessed position beneath the surface of the wind turbine blade or from a position substantially flush with the surface of the wind turbine blade. In embodiments where the flow modulation devices are provided as part of a plate or panel which can be attached to the surface of a wind turbine blade, it will be understood that the deployment of said vortex generators can result in the projection of the vortex generators above the surface of said plate or panel. The vortex generators may be provided as separate elements which can be attached or mounted to a wind turbine blade, or which may be integrated with the structure of the wind turbine blade itself.

Preferably, the vortex generators are located adjacent the trailing edge, within 5% of the length of chord from the trailing edge.

Providing the vortex generators in proximity to the trailing edge allows for the effect of the attached flow in the wake of the vortex generators to be maximized for the trailing edge devices.

Preferably, at least a portion of said vortex generators are integrally formed with at least a portion of the said flow modulation devices, wherein movement of said flow modulation devices produces corresponding movement of said vortex generators.

The flow modulation devices may be mechanically connected to deployable vortex generators, e.g. using actuators operable to raise said vortex generators from a recessed position on the wind turbine blade to a position where the vortex generators impact on the airflow over the wind turbine blade. This may be through appropriate use of strain or bending sensors, or piezoelectric materials in the flow modulation devices, wherein a bending of the flow modulation devices can be detected and used as an input to an appropriate actuator arrangement. Additionally or alternatively, a connecting element may extend between said flow modulation devices and said vortex generators, e.g. a wire, rod, or cable, arranged to effect a deployment of said vortex generators on bending of said flow modulation devices.

In a preferred embodiment, the wind turbine blade comprises a trailing edge panel or plate for attachment to the trailing edge of the wind turbine blade, the panel comprising
a base portion for attachment to a surface of the wind turbine blade; and
a plurality of flow modulation devices projecting from a side of said base portion, said flow modulation devices arranged to project from the trailing edge of the wind turbine blade,
wherein the trailing edge panel is substantially formed from a flexible material, and
wherein flexing of said trailing edge panel acts to deploy vortex generators on said base portion of said plate.

Preferably, said step of deploying the vortex generators comprises levering or raising said vortex generators above a surface of said trailing edge panel.

Preferably, said plurality of flow modulation devices are at least partly integrated with said base portion. Preferably, said plurality of flow modulation devices comprise serrations, said serrations formed integrally with and projecting from said base portion.

In one aspect, the trailing edge panel comprises a plurality of reinforcing elements extending between said flow modulation devices and said vortex generators, said reinforcing elements operable to translate a movement of said flow modulation devices into a movement of said vortex generators.

Preferably, said reinforcing elements comprise at least one of the following: a wire or rod at least partly embedded in or connected between a flow modulation device and a vortex generator, and/or a structural rib defined on said trailing edge plate extending between a flow modulation device and a vortex generator.

Preferably, said base portion comprises a substantially planar member having a plurality of partially cut-out sections defined on said planar member, said plurality of partially cut-out sections outlining a plurality of planar vortex generator profiles, wherein said plurality of partially cut-out sections are arranged to project above the surface of the wind turbine blade under action of the bending or flexing of the trailing edge panel or flow modulation devices, to form vortex generators which result in the formation of wake vortices downstream of the projecting planar vortex generator profiles.

It will be understood that, while the planar vortex generator profiles are described as being formed by partial cut-outs, the trailing edge panel may be initially formed having said plurality of partially cut-out sections defined in the body of the plate, e.g. through an initial moulding operation. Alternatively, the cut-out sections may be initially provided as frangible or breakable portions defined on the body of the panel. Alternatively, the cut-out sections may be cut into the body of a panel after initial production of a panel blank.

In one aspect, the vortex generators may have a V-shaped or serrated tooth profile. Alternatively, the vortex generators may be shaped to have a substantially crenelated profile.

Preferably, said vortex generators comprise a pair of vortex generator vanes. Preferably, said vortex generator vanes comprise a planar body, having a first side substantially in line with a direction of flow over said wind turbine blade and a second side arranged at an acute angle to the direction of flow.

Preferably, the trailing edge panel comprises at least one connecting member extending between at least a portion of said base portion and at least a portion of said partially cut-out sections.

Preferably, said at least one connecting member comprises a flexible membrane.

Preferably, said flexible membrane is arranged to form an aerodynamic bridge between said base portion and said partially cut-out sections, when said partially cut-out sections project above the surface of the wind turbine blade.

Preferably, said at least one connecting member has a defined length.

Preferably, said at least one connecting member is arranged to limit the extent to which said partially cut-out sections project above the surface of the wind turbine blade. As the connecting member may provide a link between the sides of the cut-outs and the adjacent surface of the base portion, the cut-outs can be prevented from being raised beyond a defined distance corresponding to the maximum extension length of the connecting member.

It is clear that the aerodynamic device may advantageously be operable between a non-deployed state or at rest state and a deployed state. It is also clear that the at least one flexible member projecting from the trailing edge of the blade extends substantially along the chord of the blade. In one embodiment, the flexing of the flexible member towards a pressure side or upwind side of the blade deploys the aerodynamic device. This may for instance occur, when an end part of the flexible member flexes to a position, where it is arranged on the pressure side of the chord, which acts to deploy the aerodynamic device from the suction side or downwind side of the blade or a base part of the flexible member. In general, it is clear that the aerodynamic device may be deployable relative to a base part of the flexible member.

There is further provided a trailing edge panel or plate for attachment to the trailing edge of an airfoil, preferably a wind turbine blade, wherein the panel comprises:
a base portion for attachment to a surface of an airfoil; and
at least one flexible member projecting from a side of said base portion, said at least one flexible member to be arranged in the wake of the airfoil,
wherein the trailing edge panel is substantially formed from a flexible material, and
wherein flexing of said trailing edge panel acts to deploy at least one aerodynamic device on said base portion of said panel.

Preferably, there is provided a trailing edge panel for attachment to the trailing edge of an airfoil, preferably a wind turbine blade, wherein the panel comprises:
a base portion for attachment to a surface of an airfoil; and
a plurality of flow modulation devices projecting from a side of said base portion, said flow modulation devices to be arranged in the wake of the airfoil,
wherein the trailing edge panel is substantially formed from a flexible material, and
wherein flexing of said trailing edge panel acts to deploy vortex generators on said base portion of said panel.

It will be understood that the trailing edge panel as described above can be retrofitted to an existing wind turbine blade, using any suitable attachment method, e.g. adhesion, bolting, riveting, welding, etc. The trailing edge panel may be formed from any suitable material, e.g. plexiglas, fiberglass, carbon fibre, metals, thermoplastics, thermosets, etc.

There is further provided a method for the manufacture of a trailing edge panel as described above, comprising the steps of:
providing a panel blank having a base portion and at least one flexible member projecting from a side of said base portion; and
forming at least one element on said base portion, wherein said at least one element is arranged to deploy above a surface of said base portion on flexing of said at least one flexible member.

The step of forming may comprise any processing operation performed on the panel blank to form said at least one element, which may include any one of the following operations: cutting, etching, moulding, punching.

There is further provided a wind turbine comprising at least one wind turbine blade as described above.

While the invention is described in the context of flow modulation devices, and in particular serrations, and vortex generators, it will be understood that the principles of the invention described in the above embodiments may be applied to any configuration of the wind turbine blade or the trailing edge plate, e.g. through use of at least one flexible member, e.g. an acoustic flap, serrations, bristles, etc., and/or any device suitable for influencing the aerodynamic flow over the at least one flexible member, e.g. microtabs, microflaps, vortex generators, etc.

DESCRIPTION OF THE INVENTION

An embodiment of the invention will now be described, by way of example only, with reference to the accompanying drawings, in which.

It will be understood that elements common to the different embodiments of the invention have been provided with the same reference numerals in the drawings. Furthermore, it will be understood that the drawings shown are representative, and are not to scale or illustrative of relative widths and lengths.

Figure 1:
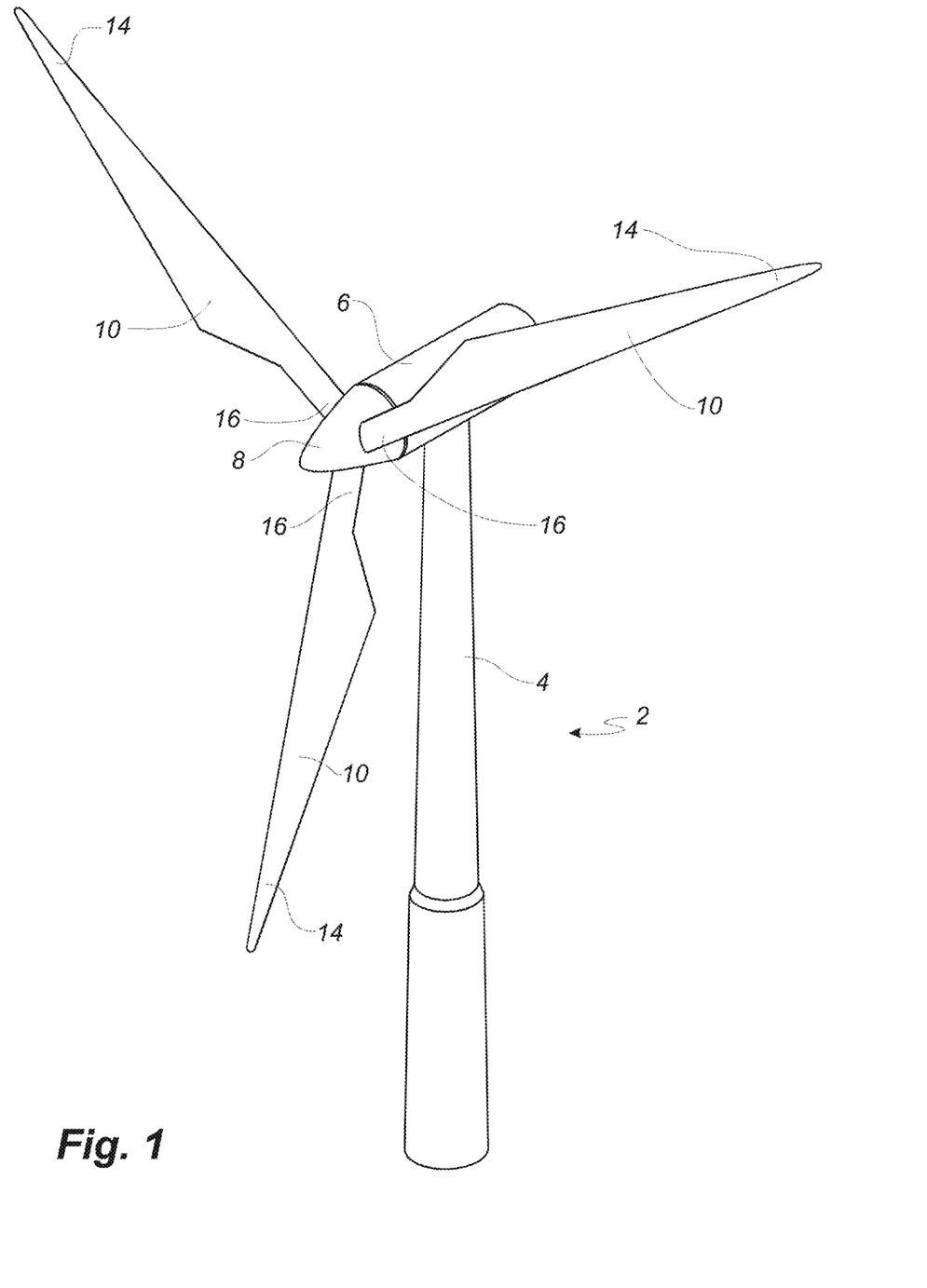
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
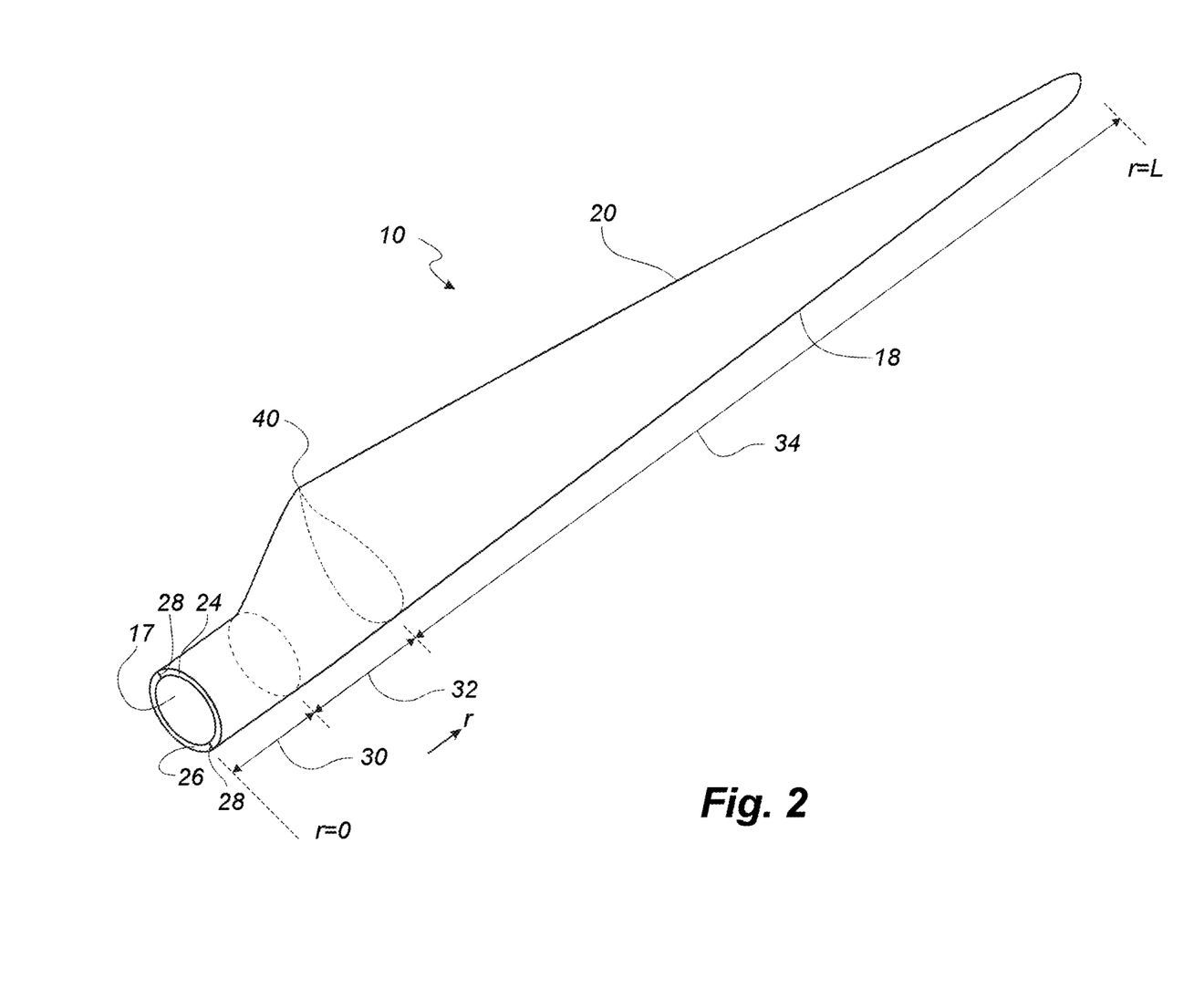
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
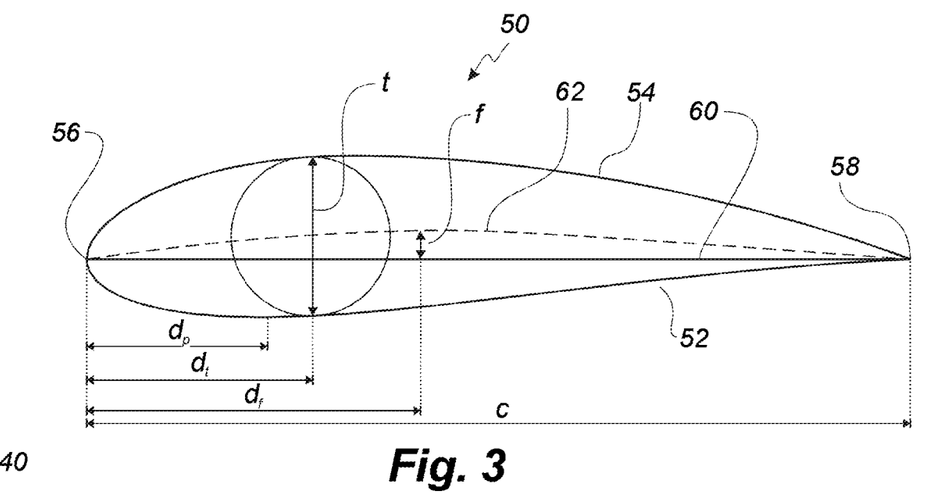
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
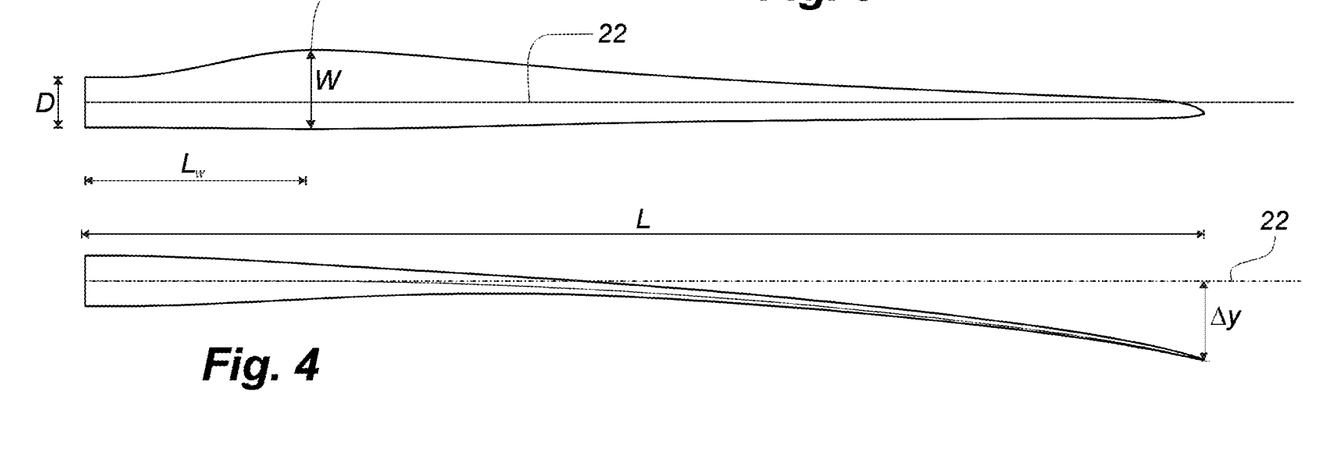
FIG. 4 shows a schematic view of the wind turbine blade of FIG. 2, seen from above and from the side.

FIG. 4 shows some other geometric parameters of the blade. The blade has a total blade length L. As shown in FIG. 2, the root end is located at position r=0, and the tip end located at r=L. The shoulder 40 of the blade is located at a position r=$L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 metres in length, having blade root diameters of several metres. Wind turbine blades are generally designed for relatively long lifetimes and to withstand considerable structural and dynamic loading.

In order to reduce trailing edge operational noise of the wind turbine blades, at least one member, preferably at least one flexible member, is arranged to project from at least a portion of the trailing edge 20 of the blade 10. Such a member may comprise an acoustic flap, and/or a series of serrations, bristles or other projecting flow modulation devices. Such members may be incorporated into and integrally formed with the structure of the wind turbine blade 10, or may be provided as a separate element which can be attached to a wind turbine blade 10 after initial manufacture or can be retrofitted to an existing blade.

Figure 5:
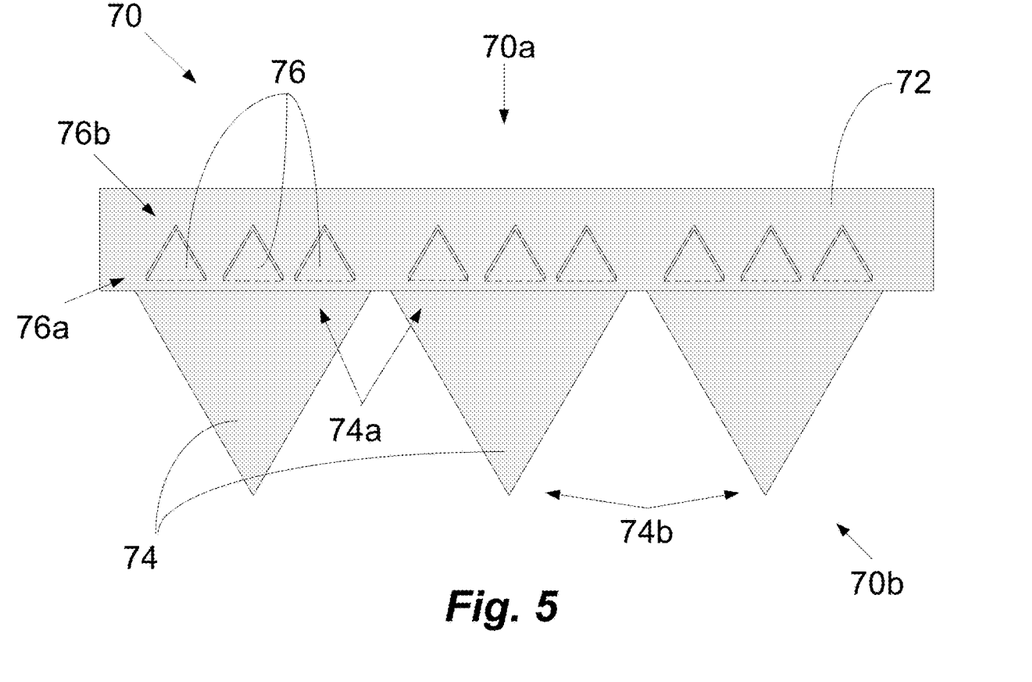
FIG. 5 illustrates a top plan view of a trailing edge plate according to an aspect of the invention.
Figure 6:
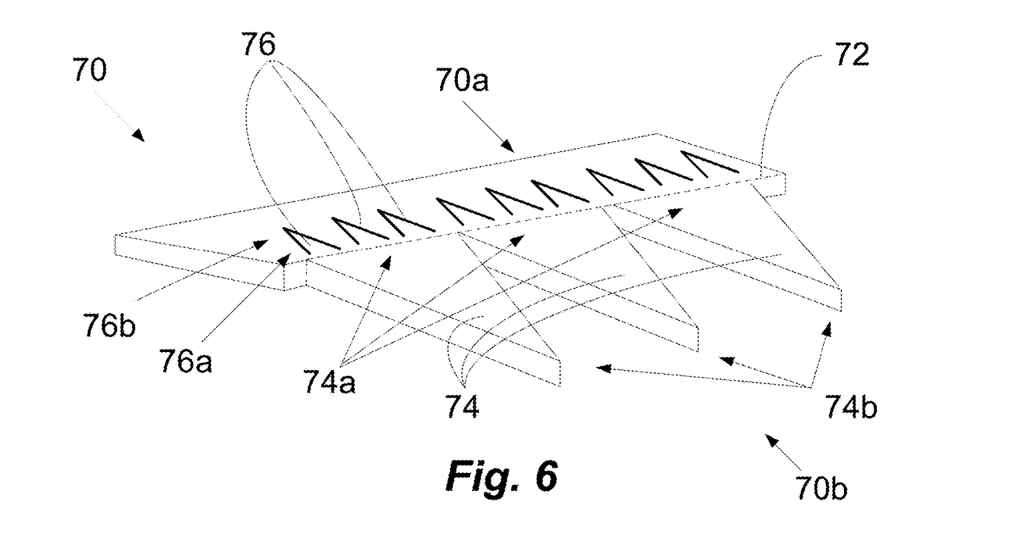
FIG. 6 illustrates a perspective view of the trailing edge plate of FIG. 5.

With reference to FIGS. 5 and 6, an embodiment of a trailing edge panel or plate according to an embodiment of the invention is indicated at 70. The trailing edge panel 70 comprises a base portion 72 for attachment to the surface of a wind turbine blade 10, and a series of serrations 74 projecting from said base portion 72. The serrations 74 extend from a base end 74a to a tip end 74b, which is to be arranged in the wake of a wind turbine blade 10. Accordingly, the base portion 72 is arranged at the leading edge side 70a of the trailing edge panel 70, and the serrations 74 are arranged at the trailing edge side 70b of the panel 70.

Figure 7A:
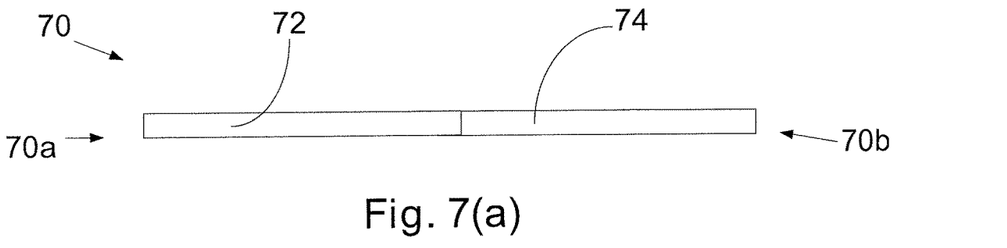
FIG. 7 shows side views of the trailing edge plate of FIG. 5 before and after flexing of the plate.

With reference to the side view illustrated in FIG. 7(a), the serrations 74 may project in substantially the same plane as the base portion 72. Alternatively, it will be understood that the serrations 74 are arranged to project at an angle to the plane of the base portion 72, preferably between approximately 0-25 degrees to the plane of the base portion 72. Preferably, the trailing edge panel 70 is formed from a material which is flexible enough to bend under action of flow over the panel 70.

On the base portion 72 of the panel 70, a series of projecting elements 76 are provided. In the embodiment of FIGS. 5 and 6, the projecting elements are formed as partial cut-outs 76 defined by a through-going channel provided in the base portion 72, the channel outlining a partially cut-out shape in the base portion 72. The elements or partial cut-outs 76 are generally arranged to have a base end 76a located towards the trailing edge side 70b of the panel 70, with a tip end 76b located towards the leading edge side 70a of the panel 70. The base end 76a of the partial cut-outs 76 is preferably integral with the base portion 72 of the panel 70, along a bending line 78. In the embodiment shown in FIGS. 5 and 6, the partial cut-outs 76 are in the shape of a V-shaped projection, pointing in the direction of the leading edge side 70a of the panel 70.

The elements 76 defined by the partial cut-outs are arranged to be substantially in line with the projecting serrations 74. In the embodiment shown in FIGS. 5 and 6, the base end 76a of three elements 76 are arranged adjacent the base end 74a of each serration 74 of the trailing edge panel 70, but it will be understood that any number of elements 76 may be arranged to be in line with each serration 74 of the panel 70, e.g. each serration 74 may be arranged in line with a single element 76.

The elements 76 defined by the partial cut-outs are effectively linked with the projecting serrations 74, such that a movement of a serration 74 will result in a corresponding movement of a linked element 76. In a first aspect, a serration and at least one element may be linked through the intrinsic structural properties of the trailing edge panel 70, wherein the bending of the trailing edge panel 70 itself results in a linked levering movement between the serration and the elements. Such a structural linkage may be due to the mechanical properties of the panel itself, e.g. in the case of a panel formed using a fibre-composite material, the fibres in such a panel may be arranged such that the primary fibre direction is substantially transverse to a hinge axis of the serrations. Furthermore, it will be understood that a reinforcing rib or corrugation may extend between a serration and linked elements, to provide for an improved structural link between the serration and the elements.

Additionally or alternatively, a mechanical linkage may be arranged between a serration 74 and one or more elements 76, e.g. the use of a connecting wire or rod embedded in or provided on the panel 70, and connecting the serration and the said elements.

While the elements 76 of FIGS. 5 and 6 are shown having the base end 76a located towards but spaced from the trailing edge side 70b of the base portion 72, it will be understood that the elements 76 may be positioned such that the base end 76a located towards but spaced from the trailing edge side 70b of the base portion 72, for example such that the base end 76a of the elements is coincident with the base end 74a of the serrations 74, substantially defining a hinge or fulcrum between the serrations 74 and the elements 76.

It will be understood that the term "cut-out" is used to define an element which is partially integrated with the body of the base portion via a base end, and which is defined by a through-going channel arranged in the base portion about the periphery of the remainder of the element, such that the element may be deflected or bent relative to the plane of the base portion 72, along a bend line located at the base end of the element. In this regard, the "cut-out" may be formed integrally with the base portion as a result of a moulding operation which defines the surrounding channels as part of the moulding operation, and/or the cut-outs can be cut or etched into the base portion 72, e.g. into a blank of a trailing edge panel 70. In addition, while the projecting elements 76 of the embodiment of FIGS. 5 and 6 are defined in the body of the base portion 72, it will be understood that in other embodiments of the invention, the projecting elements 76 may be arranged to project from the leading edge side 70a of the base portion 72 of the panel 70.

FIG. 7 illustrates a side view of the panel 70 of FIGS. 5 and 6, which can be attached to the trailing edge 20 of a wind turbine blade 10 (not shown in FIG. 7). With reference to FIG. 7(a), in an at-rest state, the serrations 74 project from the base portion 72 of the panel 70 in their normal plane. In this state, the elements or partial cut-outs 76 of the base portion 72 are arranged such that the elements 76 are in register with and flush with the adjacent surfaces of the panel 70, and do not significantly influence the aerodynamics of the panel 70.

Figure 7B:
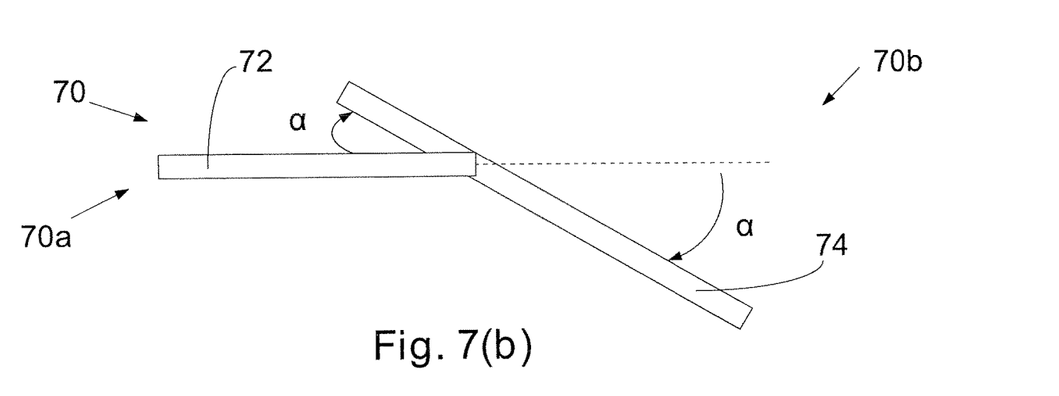

In FIG. 7(*b*), the serrations 74 of the panel 70 are deflected from their at-rest position by an angle α, for example due to the forces generated from airflow over a wind turbine blade 10. Due to the linkage between the serrations 74 and the elements 76, the elements 76 are correspondingly levered into a deployed position wherein the elements 76 project above the plane of the surface of the base portion 72 of the panel 70. In the embodiment shown in FIG. 7, the elements 76 are levered by an angle α corresponding to the deflection angle of the serrations 74, but it will be understood that a 1:1 correspondence between the levered angles is not limiting, and that the elements 76 may be raised by an angle greater than or less than a.

In a further aspect of the invention, it will be understood that a connecting portion (not shown) may be provided between the free edges of the elements 76 and the adjacent surface of the base portion 72. Such a connecting portion may be in the form of a flexible membrane, which acts to form an aerodynamic bridge between the surface of the base portion 72 and the projecting element 76. By utilising a flexible member between the base portion 72 and the elements 76, the transition between the general surface of the wind turbine blade 10 and the projecting elements 76 will be smoothened, and will prevent airflow impacting on the area beneath the projecting elements 76.

Additionally or alternatively, said connecting portion may be arranged to have a limited length, wherein the elements 76 are prevented from being raised above the surface of the base portion 72 beyond said length.

In an alternative embodiment, a covering layer (not shown) may be provided on the trailing edge plate 70, wherein a relatively flexible sheet is applied to cover at least a portion of said base portion 72 and said elements 76. The raising or levering of said elements 76 will subsequently act to deform the covering layer in a manner to define a vortex generator shape at said trailing edge 20.

As the elements 76 defined by the partial cut-outs are raised above the surface of the trailing edge panel 70, they are brought into the airflow over the wind turbine blade 10. The shape of the elements 76 is chosen such that the projecting elements 76 act as vortex generators in the airflow, creating a tip vortex downstream of the tip end 76*b* of the projecting elements 76. The tip vortex acts to draw airflow having relatively high momentum from outside the relatively slow-moving boundary layer into contact with the surface of the serrations 74, thereby re-energising the boundary layer of airflow along the serrations and delaying flow separation.

As the vortex generators are effectively only deployed when the serrations 74 are deflected to an extent sufficient to lever the projecting element 76 into the oncoming airflow, accordingly the aerodynamic properties of the wind turbine blade as a whole are unaltered for operational conditions wherein the serrations are substantially undeflected from the at-rest state, e.g. for low-velocity wind conditions, where flow separation over trailing edge serrations is not a significant issue. As the velocity of the airflow over the wind turbine blade increases to the extent that the serrations are deflected, the vortex generators are levered above the adjacent surface level and deployed into the airflow. Accordingly, the vortex generators have a dynamic deployment based on the airflow over the wind turbine blade, as the greater the wind velocity, the greater the serration deflection, and consequently the higher that the elements 76 will project above the surface of the blade and into the oncoming airflow.

The trailing edge panel 70 is arranged to be attached to the trailing edge 20 of a wind turbine blade 10, as part of an initial assembly operation or as a retrofit to an existing blade. The panel 70 may be attached using any suitable mechanism, e.g. adhesive bonding, bolting, riveting, welding, overlamination, etc. It will be understood that the trailing edge panel 70 is attached to the blade in such a manner so as to not impede the bending of the serrations and/or the projecting elements. Alternatively, the serrations and/or the projecting elements may be incorporated into the blade structure during manufacture of the blade shells, to provide for vortex generators which are deployable from a surface of the blade, based on a deflection of a trailing edge projection such as serrations.

While the elements or partial cut-outs 76 of FIGS. 5-7 are in the form of an arrowhead or V-shaped projection, it will be understood that any suitable cut-out shape may be used. For example, crenelated or square-shaped elements may be used.

Figure 8:
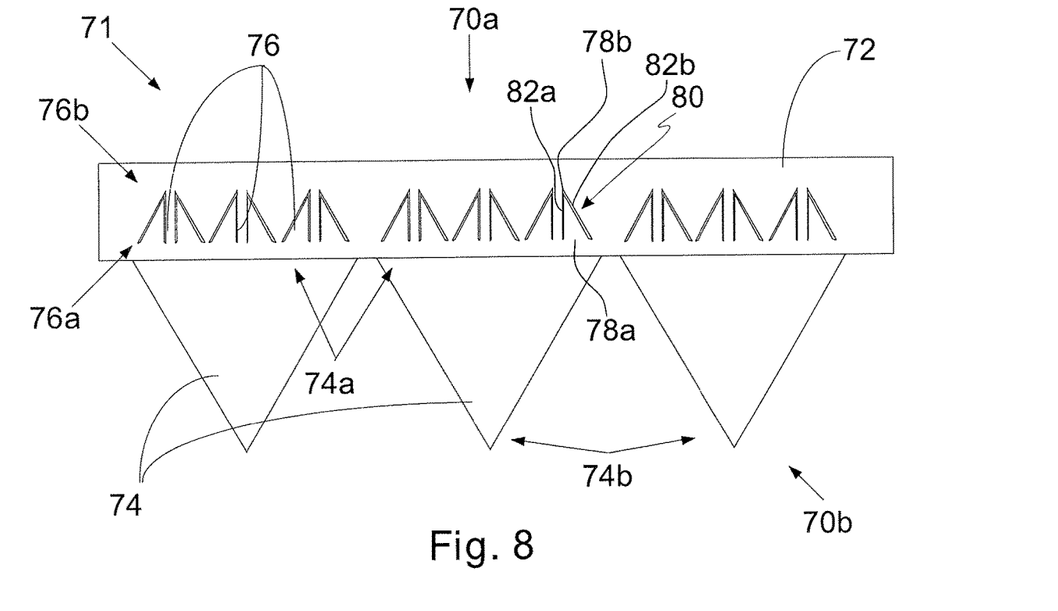
FIG. 8 illustrates a top plan view of an alternative design of trailing edge plate according to the invention.

With reference to FIG. 8, an embodiment of the invention is shown, wherein the elements are provided in the form of pairs of vortex generator vanes 80 defined in the body of the base portion 72 of a trailing edge panel 71. The vortex generator vanes 80 comprise a planar body attached to or integral with the base portion 72 of the panel 70 along a base end 78*a*, with a tip end 78*b* of the vanes 80 arranged towards the leading edge side 70*a* of the panel 70. The vanes 80 are arranged having a first side 82*a* substantially in line with a direction of flow over said wind turbine blade and a second side 82*b* arranged at an acute angle to the direction of flow.

With reference to FIG. 9, two examples of a trailing edge panel according to embodiments of the invention are shown at 73 and 75. In these embodiments, a reinforcing structural member 84 extends between the elements 76 and the adjacent serrations 74, thereby facilitating the linked movement between the elements 76 and the associated serrations 74. The reinforcing structural member 84 may comprise any suitable connecting member, e.g. a wire, brace, rod, etc. which can be arranged to extend between the elements 76 and the serrations 74, Preferably, the member 84 is relatively flexible and/or is incorporated into the structure of the trailing edge panel 70.

Figure 9A:
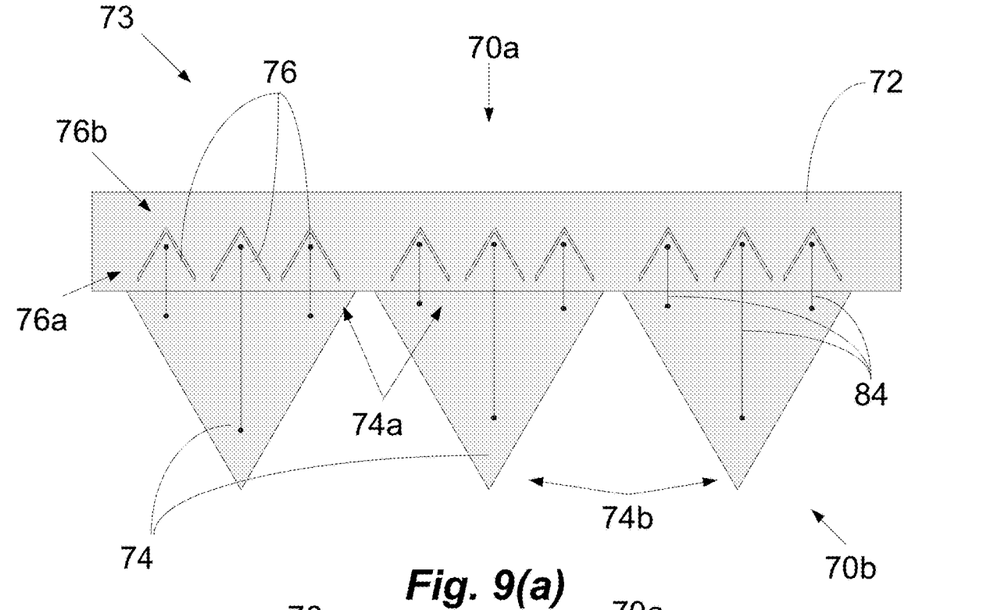
FIG. 9 illustrates alternative constructions of the trailing edge plate of FIG. 5.
Figure 9B:
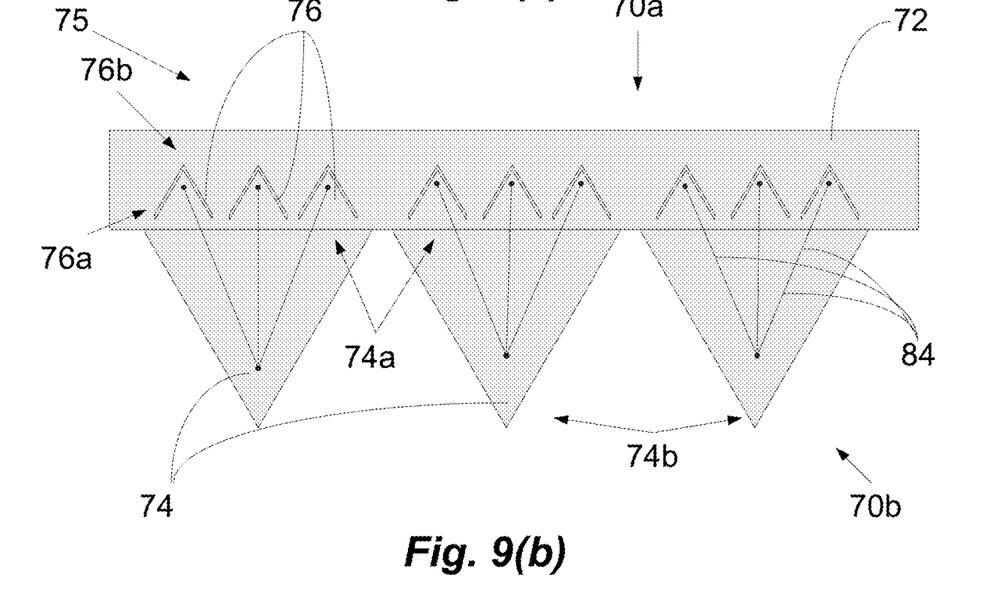

In FIG. 9(*a*), the panel 73 is configured wherein the members 84 extend from attachment points adjacent the tip ends 76*b* of the elements 76 in a direction in line with the flow direction over the wind turbine blade 10, to separate attachment points on the body of the serrations 74. As can be seen in FIG. 9(*a*), such attachment points may be distributed on the body of the serrations 74 at different lengths along the serrations in the direction of the trailing edge side 70*b*. In FIG. 9(*b*), the panel 75 is configured wherein the members 84 extend from attachment points adjacent the tip ends 76*b* of the elements 76 to a common attachment point of the adjacent serration 74, located towards the tip end 74*b* of the serrations 74.

Accordingly, a flexing of the serrations 74 results in a corresponding raising of the elements 76, to act as vortex generators deployed from the trailing edge panel 70.

While the above embodiments describe systems providing for a passive actuation and deployment of the elements 76 as vortex generators, based on the bending of the trailing edge serrations 74, it will be understood that the invention may further extend to the use of actuators or piezoelectric materials, which are operable to deploy vortex generators at the trailing edge of a wind turbine blade based on a detected deflection of the trailing edge serrations.

While in the above-described embodiments, the trailing edge panel 70 comprises serrations 74, it will be understood that any other trailing edge device may be used without departing from the invention. For example, the trailing edge panel 70 may additionally or alternatively comprise an acoustic flap and/or bristles. Such trailing edge devices may then be coupled to the element or elements 76 of the panel using any of the above-described linkages. Furthermore, while the preferred embodiments describe the use of deployable vortex generators at the trailing edge of a wind turbine blade, the invention may also relate to the use of other aerodynamic devices, such as microtabs, microflaps, etc., which may be deployable at the trailing edge of a wind turbine blade.

The use of such deployable vortex generators at the blade trailing edge results in a relatively simple mechanism for preventing flow separation over trailing edge devices such as serrations, which provides for ease of manufacturability and installation, and which provides for a dynamic adjustment of blade aerodynamics based on wind turbine operating conditions.

The invention is not limited to the embodiments described herein, and may be modified or adapted without departing from the scope of the present invention.

The invention claimed is:

1. A wind turbine blade having an airfoil profile with a leading edge and a trailing edge and a chord extending therebetween, the wind turbine blade further comprising:
   a trailing edge panel comprising a base portion and at least one flexible member projecting from a side of the base portion, wherein the base portion is attached to a surface of the wind turbine blade such that the at least one flexible member projects from the trailing edge of the wind turbine blade,
   wherein said at least one flexible member is arranged to flex under action of airflow over the wind turbine blade, and
   wherein the flexing of said at least one flexible member acts to deploy at least one aerodynamic device from the base portion of the trailing edge panel.

2. The wind turbine blade of claim 1, wherein the at least one flexible member comprises:
   a plurality of flow modulation devices projecting from the trailing edge of the wind turbine blade,
   wherein said plurality of flow modulation devices are arranged to flex under the action of the airflow over the wind turbine blade, and
   wherein the flexing of said plurality of flow modulation devices acts to deploy the at least one aerodynamic device from the base portion of the trailing edge panel, wherein the at least one aerodynamic device comprises vortex generators.

3. The wind turbine blade of claim 2, wherein said vortex generators are located adjacent the trailing edge, within 5% of the length of chord from the trailing edge.

4. The wind turbine blade of claim 2, wherein at least a portion of said vortex generators are integrally formed with at least a portion of the said flow modulation devices, wherein movement of said flow modulation devices produces corresponding movement of said vortex generators.

5. The wind turbine blade of claim 2, wherein said plurality of flow modulation devices are at least partly integrated with said base portion.

6. The wind turbine blade of claim 2, wherein the trailing edge panel comprises a plurality of reinforcing elements extending between said flow modulation devices and said vortex generators, said reinforcing elements operable to translate a movement of said flow modulation devices into a movement of said vortex generators.

7. The wind turbine blade of claim 6, wherein said reinforcing elements comprise at least one of the following: a wire or rod at least partly embedded in or connected between a flow modulation device and a vortex generator, and/or a structural rib defined on said trailing edge panel extending between a flow modulation device and a vortex generator.

8. The wind turbine blade of claim 2, wherein said base portion comprises a substantially planar member having a plurality of elements defined on said planar member, said plurality of elements outlining a plurality of planar vortex generator profiles, wherein said plurality of elements are arranged to project above the surface of the wind turbine blade under action of the bending or flexing of the flow modulation devices such that said plurality of planar vortex generator profiles form vortex generators projecting above the plane of the surface of the planar member, to form wake vortices downstream of the projecting vortex generators.

9. The wind turbine blade of claim 8, wherein the planar vortex generator profiles have a V-shaped or serrated tooth profile.

10. The wind turbine blade of claim 8, wherein said planar vortex generator profiles comprise a pair of vortex generator vanes, wherein said vortex generator vanes comprise a planar body, having a first side substantially in line with a direction of flow over said wind turbine blade and a second side arranged at an acute angle to the direction of flow.

11. The wind turbine blade of claim 1, wherein the wind turbine blade comprises a plurality of flow modulation devices projecting from the trailing edge of the blade, wherein said plurality of flow modulation devices comprise serrations.

12. A wind turbine comprising at least one wind turbine blade as claimed in claim 1.

13. A trailing edge panel for attachment to the trailing edge of an airfoil, wherein the panel comprises:
   a base portion for attachment to a surface of an airfoil; and
   at least one flexible member projecting from a side of said base portion, said at least one flexible member to be arranged in the wake of the airfoil,
   wherein the trailing edge panel is substantially formed from a flexible material, and
   wherein flexing of said trailing edge panel acts to deploy at least one aerodynamic device on said base portion of said panel.

14. The trailing edge panel of claim 13, wherein the panel comprises:
   a plurality of flow modulation devices, projecting from a side of said base portion, said flow modulation devices to be arranged in the wake of the airfoil.

15. The trailing edge panel of claim 14, wherein the plurality of flow modulation devices comprises a plurality of serrations.

16. The trailing edge panel of claim 13, wherein the airfoil comprises a wind turbine blade.

* * * * *